United States Patent [19]

Sianesi et al.

[11] 3,720,646

[45] March 13, 1973

[54] PERFLUOROPOLYETHERS MODIFIED WITH QUINONE COMPOUNDS IN THE POLYMERIC CHAIN AND PROCESS FOR THEIR PREPARATION

[75] Inventors: Dario Sianesi, Milan; Renzo Fontanelli, Roma; Alberto Grazioli, Milan, all of Italy

[73] Assignee: Montecatini Edison S.p.A., Milan, Italy

[22] Filed: March 2, 1971

[21] Appl. No.: 120,347

[30] Foreign Application Priority Data

March 3, 1970 Italy ............................ 21406 A/70

[52] U.S. Cl. ...... 260/63 HA, 204/159.14, 260/33.8 F, 260/37 R, 260/92.1 S
[51] Int. Cl. ............................................. C08g 15/00
[58] Field of Search ............. 260/63 HA 1/; 92.1 S; 204/159.14

[56] References Cited

UNITED STATES PATENTS 3,544,537  12/1970  Brace ............................ 260/89.5

*Primary Examiner*—William H. Short
*Assistant Examiner*—L. L. Lee
*Attorney*—Hubbell, Cohen & Stiefel

[57] ABSTRACT

Modified perfluoropolyethers containing, within the polymeric chain, repeating units derived from a quinone compound, are obtained by reacting a peroxidic oxygen-containing perfluoropolyether with a quinone compound, either at an elevated temperature between about 100° and 350° C or under radiation with ultraviolet light at least a portion of which is in the 200–300 millimicron range, whereby the peroxidic bridges are gradually replaced by the quinone units. The reaction is believed to proceed by a free-radical mechanism. The resulting products may be linear, branched, or cross-linked, depending upon the reaction conditions, ratio of reactants, and nature of the starting materials. The products are essentially unvulcanized rubbers which can be vulcanized by common vulcanizing agents such as diamines.

13 Claims, No Drawings

PERFLUOROPOLYETHERS MODIFIED WITH QUINONE COMPOUNDS IN THE POLYMERIC CHAIN AND PROCESS FOR THEIR PREPARATION

BACKGROUND OF THE INVENTION

1. Field of the Invention

The present invention relates to perfluoropolyether compounds containing reactive groups within the polymeric chain, as well as to a process for their preparation.

2. Description of the Prior Art

There are known perfluoropolyethers which correspond to the following general formula:

$$A - O - (CF_2O)_Q - (CF_2 - CF_2O)_R - (O)_Z - D$$

wherein A and D are terminal groups selected from the group consisting of $-CF_3$, $-COF$ and $-CF_2COF$; (Q+R) is a number between about 11 and 200; Q/R is a number between 0.2 and 5; and Z/(Q+R) is a number between 0.01 and 0.4.

These perfluoropolyethers are obtained by a photochemically activated reaction of oxygen with tetrafluoroethylene in an inert solvent, for example, a fluorinated or chlorofluorinated compound, at a temperature from $-70°$ to $0°$ C (copending U.S. application Ser. No. 702,533, filed Feb. 2, 1968).

SUMMARY OF THE INVENTION

It has now been found that the above mentioned perfluoropolyethers may be reacted with quinone compounds under suitable conditions in order to obtain modified perfluoropolyethers containing quinone groups along the chain of the macromolecule.

The process of the present invention comprises contacting the above mentioned perfluoropolyethers, containing peroxidic oxygen, with a quinone or halogenated quinone compound and subjecting the mixture to conditions such that a gradual breaking down of the peroxidic bridges occurs and insertion of quinone molecules within the perfluoropolyether chain takes place.

The breaking down of the peroxidic bridges contained in the starting perfluoropolyether compound may be caused either by ultraviolet irradiation or by heating.

The process of the present invention can, therefore, be carried out photochemically by irradiating the reaction mixture with U.V. light, preferably in the absence of oxygen, the radiation wavelength being at least partially between 200 and 300 millimicrons, and the reaction temperature being preferably about or slightly higher than room temperature (about $20°$ to $30°$ C).

Alternatively, the process of the present invention can be carried out by heating the reaction mixture, preferably in the absence of oxygen, to a temperature between about $100°$ and $350°$ C, preferably between about $150°$ and $250°$ C.

DESCRIPTION OF THE PREFERRED EMBODIMENTS

The process of the present invention, conducted either by photochemical or thermal methods, can be conducted either in the presence or in the absence of diluents or solvents. The thermal process can also be conducted under pressure, considering that gaseous micromolecular products (predominantly $COF_2$) evolve during the course of the reaction. The pressure can be between 1 and 100 atm. or more.

When using the solvents or diluents, these are generally selected from the group of conventional fluorinated solvents (e.g., $CF_2Cl_2$, $C_2F_3Cl_3$, hexafluorobenzene, perfluorocyclobutane) which are liquid under the conditions at which the reaction is carried out. Among these, particularly suitable for use are the perfluoroether oils (linear oligomers), which are quite inert and stable and, moreover, transparent to U.V. radiations.

Since, normally, the quinone compound is not very soluble in the starting perfluoropolyether compound, it is convenient and preferable, when operating in the absence of solvents, to submit the mixture of reactants to stirring, at least at the beginning of the reaction. As the reaction proceeds, the quinone compound is gradually solubilized in the perfluoropolyether liquid phase.

The starting perfluoropolyethers have the general formula:

$$A - O - (CF_2O)_Q - (CF_2-CF_2O)_R - (O)_Z - D$$

wherein the recurring units have a random distribution along the polyether molecule; A and D, which may be the same or different, are terminal groups selected from the group consisting of $-CF_3$, $-COF$ and $-CF_2-COF$; Q and R, the same or different, are integers from one to 150, Z is an integer from one to 50; (Q+R) is a number between about 11 and 200, preferably greater than 50; Q/R is a number between 0.2 and 5, and preferably between 0.3 and 3; and Z/(Q+R) is a number between 0.01 and 0.4, preferably between 0.05 and 0.2. These products, which contain the basic perfluoroalkylene groups specified in the aforesaid formula and essentially consist of $(CF_2)_n-O-$ groups, wherein $n$ is one or two, normally also contain small amounts of perfluoroalkylene groups which are different from the basic ones, wherein $n$ is a number between three and 10, and which scarcely affect the properties or the behavior of the products in the process of the present invention. These groups are generally present in an amount lower than 5 percent by weight based on the weight of the perfluoropolyether.

In carrying out the process of the present invention, there can also be used perfluoropolyethers having a structure which is like the one specified in the aforesaid formula but wherein the terminal groups are replaced by the groups obtained by hydrolysis, esterification, amidation, etc., of said perfluoropolyethers.

In fact, the terminal groups of the starting perfluoropolyether compounds have no influence on the course of the reaction in the process of this invention.

The process of the present invention can also be applied to mixtures of peroxidic perfluoropolyethers containing products having linear or cyclic structures.

Suitable quinone compounds which may be used in the process of the present invention are those having the quinone structure either in its ortho- or para- form. Therefore, there may be used, for instance, o- and p- benzoquinones, o- and p- naphthoquinones, anthraquinones, and the like.

Moreover, the partially or completely halogenated derivatives of these quinone compounds may be used, the halogen atoms being the same or different from each other. Preferred quinone compounds are the benzoquinones, more particularly p-benzoquinone and the halogenated p-benzoquinones. The preferred quinone compounds for use in the present invention may be represented by the following structure:

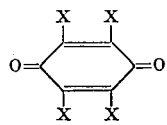

wherein each X is selected from the group consisting of hydrogen, fluorine, chlorine and bromine. Thus, when all the X's are hydrogen, the compound is p-benzoquinone; when all the X's are chlorine, it is chloranil; and when all the X's are bromine, it is bromanil.

The amount of quinone compound reacted with the perfluoropolyether is determined by the amount of peroxidic oxygen contained in the starting perfluoropolyether and the structure and properties desired for the end product. Generally, the maximum amount of quinone that may be introduced into the chain of the starting perfluoropolyether is limited by the amount of peroxidic groups in the perfluoropolyether, i.e., by the value of Z, bearing in mind that there is necessary 1 mole or less of quinone for each peroxidic bridge.

It has been found that there is a direct relationship between the structure of the reaction products and the amount of quinone compound present during the course of the reaction, it being possible to obtain either prevailingly linear or branched or cross-linked products, depending on this amount. Thus, it has been observed that when there is always present during the reaction a quantity of quinone compound sufficient for reacting with the perfluoropolyether radicals that are gradually formed, and when the peroxidic group content of the starting perfluoropolyether is relatively low, then products having a linear structure are prevailingly obtained. For instance, when starting with a perfluoropolyether containing less than 1 percent by weight of peroxidic oxygen and employing with a molar ratio of quinone compound to peroxidic groups between about 1.05 and 5, there are prevailingly obtained products having a linear structure.

Moreover, it has been found that by starting with perfluoropolyethers having a high peroxidic group content and by using a molar ratio of quinone compound to peroxidic groups lower than 1, there are obtained products having either an essentially branched or cross-linked structure. For instance, when starting with a perfluoropolyether containing more than 1.5 percent of peroxidic oxygen and using a molar ratio of quinone compound to peroxidic oxygen lower than one, there are predominantly obtained products with a branched or cross-linked structure.

It has been noticed also that whether or not a solvent is used has a certain influence over the structure of the reaction product. In fact, the use of a solvent permits the obtaining of products having a less branched structure than that of those products which are obtained under the same conditions but in the absence of solvents.

According to one theory of the invention, (while, of course, not being bound thereby), it is believed that upon by heating or irradiating with U.V. radiations the perfluoropolyethers containing peroxidic oxygen there occurs a gradual breakage of the peroxidic bridges with the formation of macroradicals of the formula $\sim\!O\!-\!CF_2\!-\!CF_2O\cdot$ and $\sim\!O\!-\!CF_2O\cdot$, which are, at least partially, further transformed so as to release the following monomeric radicals: $-OCF_2\cdot$ and $O\!-\!CF_2\!-\!CF_2\cdot$.

It is believed that these radicals, which normally would recombine with each other, interact with the quinone compound, which, in some cases, may, as is known, act as a biradical. Several reactions are possible, such as for instance the following, in which the quinone compound is p-benzoquinone or halogenated p-benzoquinone.

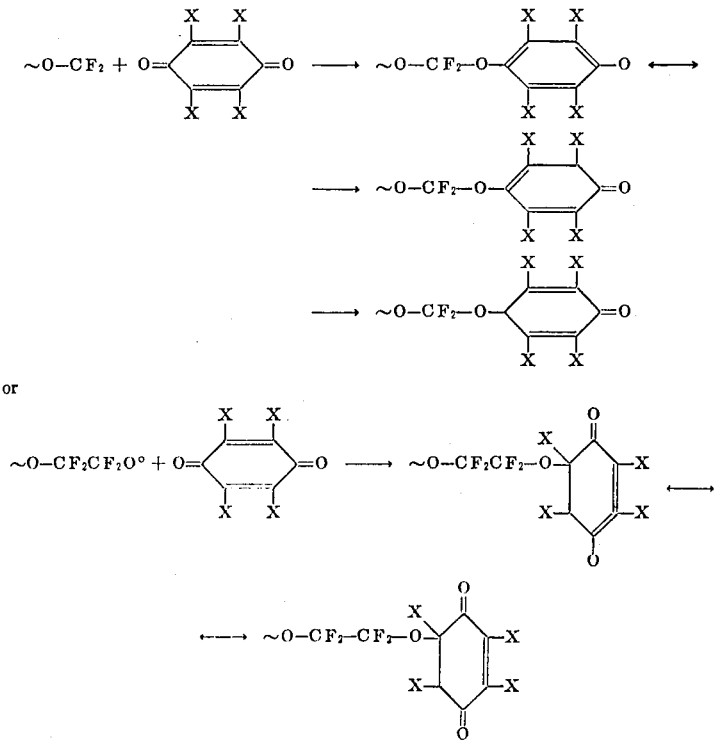

wherein X is hydrogen, fluorine, chlorine or bromine.

The different radicals, formed by addition of the perfluoropolyether radical to the quinone, react by coupling with other perfluoropolyether radicals present in the system. As a final result thereof, a molecule of the quinone compound is inserted between two perfluoropolyether chains.

The resulting structures contain conjugated double bonds (e.g., C=C —C=C or C=C— C=O). Therefore, the products may further react with other perfluoropolyether macroradicals, leading to the formation of branched structures or, by further reaction, to the formation of cross-linked structures.

The configuration of such structures may be, for instance, represented by the following formulas:

(1)     —P—T—P—T—P—

(2)           P—T—P
              |
         —P—T—P—T—P—
              |
             —P (3)        P—T—        P—
           |            |
       P—T—P—T—P—T—P—
       |    |    |
       P    P    P
                 |
            P—T—P—T—P—
            |    |

In the foregoing formulas, P represents linear perfluoropolyether chains (which may be different from each other) consisting of a succession of the same or different perfluoroalkylene units, bound to each other via ether oxygen bonds. In general, the chain P is formed from 11 to 200 units of —CF$_2$O— and —CF$_2$—CF$_2$—O— randomly distributed along the chain, and the average ratio CF$_2$O/C$_2$F$_4$O is between about 5 and 0.2.

When the chain P is not connected at both ends to the groups represented by T, it will have a terminal group selected from —CF$_3$, —COF and —CF$_2$COF or a group derived from these terminal groups by hydrolysis, esterification, amidation, salification, etc., depending on the starting perfluoropolyether compound.

The group represented by T has the formula C$_6$X$_4$O$_2$, wherein X is selected from the group consisting of H, F, Cl and Br, and a cyclic structure characterized by a ring of six carbon atoms and by the presence of one or more double bonds. The structure of such a group may be described as benzenic, cyclohexadienic or cyclohexenic. Group T is chemically bound to two or more perfluoropolyether chains and (whatever the nature and number of these bonds) always contains one or more double bonds.

When the quinone compound is p-benzoquinone or halogenated p-benzoquinone, the structure of the T-group bound to two perfluoroether chains may be represented, for instance, by one or more of the following formulas:

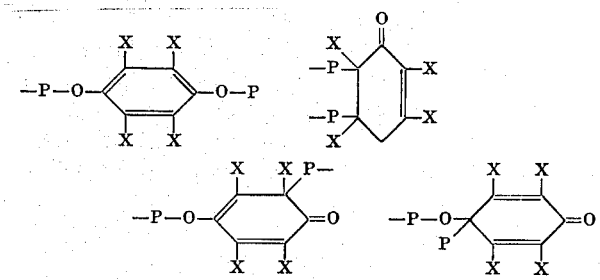

wherein X is hydrogen, fluorine, chlorine or bromine. The structure of the group T, bound to more than two perfluoropolyether chains, may be different, for instance:

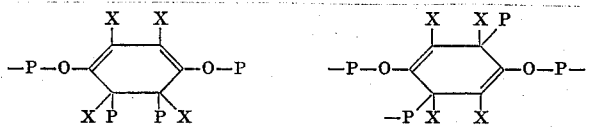

It must be understood that in said formulas the chain P is bound to an oxygen atom which was initially part of the quinone compound via its terminal group, which may be either ~O—CF$_2$— or ~OCF$_2$—CF$_2$—. When, on the contrary, chain P is bound to a carbon atom which was initially part of the quinone ring, then a bond is established through one of aforesaid groups ~O—CF$_2$— or ~OCF$_2$—CF$_2$— or through a group selected from ~O—CF$_2$O— and ~OCF$_2$CF$_2$O—. In other words, the chemical bond between T and P is of the C—O or C—C type, never of the peroxidic (O—O) type.

The products of this invention may contain from 0.1 to 10 percent by weight of quinone compound. The inserted quinone unit content may be calculated from the analytical data obtained by elemental analysis (provided the halogenated quinone molecule contains halogens other than fluorine).

The nuclear magnetic resonance spectrum of the compounds of the present invention shows the presence of —CF$_2$— groups near the inserted quinone unit.

The U.V. absorption spectrum shows absorptions at wavelengths of 200 and 285 millimicrons, which are absent in the starting perfluoropolyether and which are attributable to the inserted structures.

The products having a linear structure are viscous liquids which are miscible with fluorinated solvents (e.g.: CF$_2$Cl$_2$, C$_2$F$_3$Cl$_3$, hexafluorobenzene, perfluorocyclobutane). Their molecular weight may vary from a few thousand to many tens of thousands.

The products having a branched structure are at least partially soluble in fluorinated solvents and, as the degree of branching increases, they become increasingly viscous and increase in molecular weight, achieving high values of viscosity and molecular weight.

The products which are substantially crosslinked are practically insoluble in all solvents and take on the consistency and physical characteristics of elastomers as the degree of vulcanization or crosslinking increases. These elastomeric products show a high thermal stability and resistance to thermal oxidation.

The cross-linked products may be employed as elastomeric materials, particularly in applications requiring good resistance to solvents and good elastomeric properties at low temperatures.

The modified products of the present invention have a very high reactivity due to the inserted structures. These structures, which may be either aromatic or nonaromatic but are always unsaturated, are active both in addition and substitution reactions with reactants such as amines, alcohols, thioalcohols, phenols, etc., as well as with free radical reactants.

When the inserted structures contain halogen atoms, that is, when the modified perfluoropolyether has been prepared from a halogenated quinone compound, the product of the present invention has the typical activity of the perhalogenated aromatic nuclei and, generally, of the perhalogenated unsaturated systems, with regard to addition and substitution reactions.

The high reactivity of the products of the invention permits further transformations and uses. For example, these compounds may be transformed by reaction with difunctional basic agents, even in admixture with inert and reinforcing fillers, into vulcanized rubbers characterized in particular by valuable elastomeric properties at low temperatures.

The following examples are presented in order to further illustrate the present invention, without thereby limiting the scope thereof.

EXAMPLE 1

The starting peroxidic perfluoropolyether was obtained in the following way:

In a cylindrical glass reactor, having a diameter of 70 mm and a volume of about 600 cc, equipped with an internal coaxial sheath of transparent quartz having an outside diameter of 20 mm and a length of 200 mm, and fitted with a gas inlet pipe and a reflux condenser maintained at a temperature of $-78°$ C, there were condensed 500 cc of $CF_2Cl_2$ by cooling with an external bath at $-78°C$.

A gaseous mixture consisting of 30 liters/hr. of oxygen and 15 liters/hr. of tetrafluoroethylene was bubbled into the reactor through the inlet pipe. The two gases were drawn separately by pumps from two gasometers, dried and transferred into the reactor in a continuous and metered flow.

The liquid mixture in the reactor was brought to a temperature of $-35°$ C, and an ultra-violet Hg vapor lamp of the Hanau TO 81 type was placed within the quartz sheath. The wave lengths which emanate from the lamp are between about 200 and 300 millimicrons.

The U.V. irradiation and the feeding of the gaseous mixture were continued for 3 hours, while the gases flowing out of the reactor were removed after passing through the reflux condenser and washing in an alkaline solution.

The U.V. lamp was switched off, the feeding of the $C_2F_4$ was interrupted and the oxygen was allowed to bubble through for a further period of 10 minutes.

Thereupon, the solvent was removed from the reactor by evaporation, under reduced pressure, and there were thus obtained 40 g of a liquid polymeric product whose structure, by elemental, iodometric and nuclear magnetic resonance (NMR) analyses, was found to be a perfluoropolyether represented by the formula: $AO(C_2F_4O)_R-(CF_2O_Q-(O)_zD$, wherein the ratio R/Q was 0.75 and the peroxidic oxygen content was 1.80 percent by weight. The molecular weight was greater than 10,000, so that the terminal groups were not determinable by NMR analysis. The NMR analysis also revealed the presence of about 3 percent by weight of perfluoroalkylene units having a $(CF_2)_n-O-$ structure wherein $n$ has a value greater than two (average value about 3.5).

A sample of 10 g of this product was reacted in a glass flask, fitted with a stirrer, a thermometer and a reflux condenser, with 1 g of tetrachloro-p-benzoquinone (chloranil) (the molar ratio of chloranil to peroxidic oxygen being 0.37) at an initial temperature of 160° C.

This temperature was then slowly raised to 220° C. within 10 hours.

As the reaction proceeded, the liquid became more and more viscous, reaching the consistency of a non-vulcanized rubber.

During the course of the reaction, there evolved some gas, prevailingly $COF_2$. There were obtained 9.8 g of a product which was free of peroxidic oxygen.

The product was then extracted for a long time in a continuous extraction apparatus, first with $CF_2Cl-CFCl_2$ and then with benzene, in order to eliminate any possible excess of chloranil. After extraction, there were obtained 9.0 g of a rubbery product.

Elemental analysis of the extract product yielded the following results (by weight): Cl = 4.3 percent; F = 58.0 percent; C = 21.14 percent; O = 16.5 percent. From these data can be derived the following average formula, based upon one chloranil unit: $C_{50}F_{100}O_{34}(C_6Cl_4O_2)$. The chloranil content amounted to about 7 percent by weight.

The rubber obtained after extraction, when contacted with a vulcanizing agent of the diamine type (hexamethylenediamine), reacted at room temperature, yielding a vulcanized rubber characterized by valuable elastomeric properties at low temperatures.

EXAMPLE 2

115 g of a product obtained by photooxidation of $C_2F_4$ according to the process described in Example 1 were heated in a glass flask at 180° C for about 4 hours. 100 g of a perfluoropolyether of a structure similar to the one described in Example 1, with an R/Q ratio of 0.52 and with a peroxidic oxygen content of 0.5 percent by weight, were obtained.

This perfluoropolyether was reacted in accordance with the method described in Example 1 with 10 g of chloranil. (The molar ratio of chloranil to peroxidic oxygen was 1.32.) At the end of the treatment there were obtained 105 g of a very viscous product, free of peroxidic oxygen, which was filtered through a porous filter G1 in order to eliminate the excess of unreacted chloranil. The weight of the product after filtering amounted to 103 g. Elemental analysis showed the following composition (by weight): Cl = 3.0 percent, F = 56.1 percent, C = 19.9 percent; O = 21 percent. From this can be derived the average formula, (based upon one unit of chloranil), $C_{74}F_{140}O_{58}(C_6Cl_4O_2)$. The chloranil content was about 6 percent by weight. This viscous oil, when treated with 5 percent by weight of hexamethylenediamine and with 10–20 percent by weight of magnesium oxide at a temperature from room temperature to 100° C, yielded a mass showing the characteristics of a vulcanized rubber.

EXAMPLE 3

107 g of a peroxidic perfluoropolyether, prepared by photooxidation of $C_2F_4$ as described in Example 1, were heated in a glass flask for 1 hour and 30 minutes at a temperature of 180° C.

At the end of this period, there were obtained 100 g of a perfluoropolyether having a structure similar to that already described, with an R/Q ratio of 0.70 and with a peroxidic oxygen content of 1.4 percent by weight.

100 g of this perfluoropolyether were reacted, according to the method described in Example 1, with 2 g of chloranil. (The molar ratio of chloranil to peroxidic oxygen was 0.09.) At the end of the reaction, there were obtained 84 g of a rubber product which was free of peroxidic oxygen. The chloranil reacted completely.

Elemental analysis of the product showed the following composition (by weight): Cl = 1.3 percent; F = 60.2 percent; C = 20.0 percent; O = 18.5 percent. From these data can be derived the following average formula, based upon one chloranil unit:
$C_{174}F_{344}O_{126}(C_6Cl_4O_2)$, corresponding to a chloranil content of 2 percent by weight.

This product acquired the consistency and appearance of vulcanized rubber when treated at a temperature of about 100° C with small quantities of bifunctional basic agents, such as, for instance, aliphatic diamines (hexamethylenediamine), and with magnesium oxide.

EXAMPLE 4

The peroxidic perfluoropolyether used in this example was synthesized with the same equipment as that described in Example 1, by reacting at a temperature of −45° C.

The irradiation was continued for 3 hours. There were obtained 75 g of an oily perfluoropolyether of the formula: $AO-(C_2F_4O)_R-(CF_2O)_Q-(O)_Z-D$, with an R/Q ratio of 1.32, and a molecular weight greater than 10,000, so that the terminal groups were not determinable by NMR analysis. The peroxidic oxygen content amounted to 2.7 percent by weight.

The $(CF_2)_nO-$ unit content, with an average value of $n$ of about 3.5, was calculated to be about 3 percent by weight.

44 g of this product, admixed with 0.5 g of chloranil, were introduced into a test tube of quartz fitted with a stirrer and provided with a reflux condenser. The reaction mixture was then irradiated with a U.V. lamp located outside the test tube. There was observed a slow formation of gas. As soon as the yellow coloring of the suspended chloranil disappeared, new small portions (0.1 g) of chloranil were added up to a total of 1 g within 30 hours.

The reaction was continued for 30 hours. Then the excess chloranil was filtered off. The colorless filtrate showed a peroxidic oxygen content of 1.8 percent.

This product was then heated to 230° C in order to eliminate the peroxidic oxygen. Elemental analysis of a sample of the residue (32 g) showed a chloranil content of 1.07 percent by weight. The very viscous and partially insoluble product, when heated to 150° C with a vulcanizing agent of the diamine type (hexamethylenediamine) and with magnesium oxide, increased in viscosity to the consistency of vulcanized rubber.

EXAMPLE 5

15 g of the peroxidic perfluoropolyether used in Example 2 were reacted according to the method described in Example 1 with 0.75 g of tetrabromo-p-benzoquinone (bromanil). (The molar ratio of bromanil to peroxidic oxygen was 0.38.)

There resulted a loss in weight of 9.2 percent. The liquid product, after filtering off the excess bromanil, no longer contained peroxidic oxygen. Elemental analysis showed the following composition (by weight): Br = 2.2 percent; C = 20 percent; F = 60.2 percent; O = 17.6 percent, from which may be calculated a bromanil content of 2.9 percent by weight.

This product, when treated with hexamethylenediamine (2 percent by weight) and with magnesium oxide (10–20 percent by weight) at room temperature, exhibited a great increase in viscosity and gradually was transformed into a vulcanized and insoluble rubber.

EXAMPLE 6

50 g of the peroxidic perfluoropolyether obtained by the process described in Example 1 were reacted, following the method described in Example 1, with 5 g of tetrafluoro-p-benzoquinone (fluoranil). (The molar ratio of fluoranil to peroxidic oxygen was 0.5.) At the end of the reaction, the product no longer contained peroxidic oxygen and had acquired the consistency of unvulcanized rubber.

This rubber was extracted for 24 hours with $CF_2Cl-CFCl_2$ in order to eliminate any fluoranil that may not have reacted.

Elemental analysis of the product showed a fluorine content lower than that of the starting perfluoropolyether (C/F ratio of 0.55, as compared to the C/F ratio of 0.50 for the starting perfluoropolyether).

The reaction product was reacted at 100° C with 3 percent by weight of hexamethylenediamine and 10–20 percent by weight of magnesium oxide to yield a vulcanized rubber showing valuable properties, and particularly good elastic yield at low temperatures.

EXAMPLE 7

15 g of the perfluoropolyether used in Example 4 were reacted by the method described in Example 1 with 0.5 g of p-benzoquinone. (The molar ratio of quinone to peroxidic oxygen was 0.12.)

At the end of the reaction, the product has coagulated in a mass having the consistency of an unvulcanized rubber, and a weight loss of 17.8 percent was observed.

Samples of this product were vulcanized by reaction with small quantities of compounds capable of forming free radicals (e.g., benzoyl peroxide) at a temperature between 80° and 200° C.

EXAMPLE 8

100 g of the perfluoropolyether used in Example 4 were dissolved in 100 g of Fomblin Y/04 (commercial product of Montecatini Edison; fraction of a linear perfluorinated polyether of low molecular weight, b.p. 80°–210°C at 0.3–0.4 mm Hg).

To this solution were then added 10 g of chloranil (molar ratio of chloranil to peroxidic oxygen = 0.25) and, following the method described in Example 1, the mixture was heated slowly to 220° C.

There was observed a total loss in weight of 10.5 percent. At the end of the reaction the excess chloranil was filtered off and the solvent was then distilled by heating to 200° C at a pressure of 0.1 mm Hg. The residue was a very viscous oil which, upon elemental analysis, showed the following composition (by weight): Cl = 5.1 percent; F = 59.1 percent, C = 21.3 percent; O = 14.4 percent, from which the chloranil content was calculated to be 8.1 percent by weight.

This viscous oil, when reacted at 100° C with 1 percent by weight of hexamethylenediamine and with 10 percent by weight of magnesium oxide, coagulated into a rubbery mass.

EXAMPLE 9

15 g of the end product obtained in Example 2, containing about 6 percent by weight of chloranil within the perfluoropolyether chain, were reacted at 180° C for 2 hours with 2 g of a perfluoropolyether prepared by the method of Example 4 (peroxidic oxygen = 2.7 percent).

The initial reaction product appeared as a viscous oil which, during the course of the reaction, was gradually transformed into a compound having the consistency of an insoluble rubber. This rubber, when reacted with hexamethylenediamine, was further converted in a vulcanized rubber.

Variations can, of course, be made without departing from the spirit and scope of the invention.

Having thus described our invention, what we desire to secure by Letters Patent and hereby claim is:

1. A process for the preparation of a modified perfluoropolyether which comprises reacting (1) a starting perfluoropolyether containing peroxidic oxygen and having the formula:

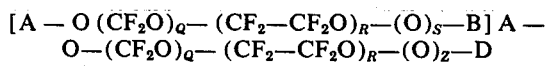

$$[A - O(CF_2O)_Q - (CF_2-CF_2O)_R - (O)_S - B] A - O - (CF_2O)_Q - (CF_2-CF_2O)_R - (O)_Z - D$$

wherein the recurring units have a random distribution along the polymeric chain; each of A and D are terminal groups selected from the group consisting of — $CF_3$, —COF and —$CF_2$—COF; Q and R are each integers from 1 to 150, Z is an integer from one to 50; the sum (Q+R) is a number between 11 and 200; the ratio Q/R is a number between about 0.2 and 5; and the ratio Z/(Q+R) is a number between about 0.01 and 0.4; with (2) a quinone compound selected from the group consisting of o- and p-benzoquinone, the partially and completely halogenated o- and p-benzoquinones, the halogenated and unhalogenated o- and p-naphthoquinones, and halogenated and unhalogenated anthraquinone, wherein the halogens are selected from the group consisting of fluorine, chlorine and bromine, said reaction being performed either (i) in the presence of ultraviolet light, at least a portion of the radiations of which have a wavelength between about 200 and 300 millimicrons, at a temperature of about 20° to 30° C., or (ii) at an elevated temperature between about 100° and 350° C., whereby to cause a gradual breaking down of the peroxidic bridges of the perfluoropolyether and the insertion at the peroxidic bridge sites, within the perfluoropolyether macromolecular chains, of 0.1 to 10 percent by weight based on the weight of the modified perfluoropolyether of quinone monomeric units.

2. The process of claim 1 wherein the sum (Q+R) is greater than 50.

3. The process of claim 1 wherein the ratio Q/R is between about 0.3 and 3.

4. The process of claim 1 wherein the ratio Z/(Q+R) is between about 0.05 and 0.2.

5. The process of claim 1 which is performed in the absence of free oxygen.

6. The process of claim 1 which is performed in the absence of solvent.

7. The process of claim 1 which is performed in the presence of a fluorinated solvent which is liquid under the reaction conditions.

8. The process of claim 1 which is performed under elevated pressure.

9. The process of claim 1 wherein the reaction temperature is between about 150° and 250° C.

10. The process of claim 1 wherein the quinone compound is selected from the group consisting of p-benzoquinone, tetrafluoro-p-benzoquinone, tetrachloro-p-benzoquinone and tetrabromo-p-benzoquinone.

11. The process of claim 1 wherein the molar ratio of the quinone compound to the peroxidic oxygen groups in said starting perfluoropolyether is less than 5.

12. The process of claim 7 wherein the fluorinated solvent is selected from the group consisting of $CF_2Cl_2$, $C_2F_3Cl_3$ hexafluorobenzene and perfluorocyclobutane.

13. A modified perfluoropolyether obtained by the process of claim 1.

* * * * *